United States Patent Office 2,701,817
Patented Feb. 8, 1955

2,701,817

TREATMENT OF PARA-DICHLOROBENZENE

Jacob Rosin, Maplewood, N. J., assignor to Montrose Chemical Corporation of California, a corporation of Delaware No Drawing. Application August 30, 1952,
Serial No. 307,372

5 Claims. (Cl. 260—650)

This invention relates to a process for the purification of para-dichlorobenzene from mixtures containing various chlorinated benzenes.

In the manufacture of monochlorobenzene, such as by the introduction of chlorine into benzene with a catalyst, a portion of the benzene is chlorinated to dichlorobenzenes or higher chlorinated benzenes. Thus, the final reaction mixture contains about 10% to 12% of polychlorinated benzenes which consist primarily of the dichlorobenzenes, but which also contain more highly chlorinated benzenes. The reaction mixture may be distilled to take off the monochlorobenzene, leaving the polychlorinated benzenes as bottoms. By chilling the bottoms, one may crystallize out the p-dichlorobenzene, but it is difficult to isolate pure para-dichlorobenzene from this mixture of polychlorinated bottoms since the crystals, upon filtration, contain adherent mother liquor. The mother liquor contains the other chlorinated benzenes. Known solvents for the mother liquor have the disadvantage of either precipitating undesirable substances from the mother liquor so that it contaminates the filter cake, or dissolving some of the p-dichlorobenzene, lessening the yield.

It is therefore an object of the present invention to provide a method of separating p-dichlorobenzene from polychlorinated mixtures without the use of expensive solvents, in high yield, and without the use of any special equipment.

From the polychlorinated bottoms, or these bottoms redistilled, the p-dichlorobenzene is the most readily crystallized of any of the chlorinated benzenes, and it is only necessary to chill the bottoms to precipitate out the dichlorobenzene. Ordinarily, it is not practical to separate out all the paradichlorobenzene in a single crystallization step, unless an additional solvent is used, for the reason that the mixture becomes too thick to be readily stirred. Therefore, the crystallization procedure is ordinarily conducted in at least two steps. When the redistilled polychlorinated mixture is chilled to a sufficiently low temperature to precipitate out at least a portion of the p-dichlorobenzene, the mixture is filtered and the filter cake is then slurried in an aqueous solution containing a wetting agent. Ordinarily, the quantity of aqueous solution to be employed is about twice the weight of the filter cake to be treated and the aqueous solution may contain about 5% of the wetting agent.

Any of the well-known emulsifying agents, including ordinary soap, may be used in the present process, but I prefer to use those which do not form a precipitate in hard waters, such as petroleum sulfonates, aryl alkyl sulfonates, sulfated alcohols, esters of polyethylene glycol with fatty acids, and the like. A list of suitable wetting agents is found in Chemical Industries, volume 61, pages 811–824 (November 1947). One particularly suitable emulsifying agent is that sold on the market as Drew's Base M–401, which contains about 90% polyglycol esters of fatty acids, and about 10% of petroleum sulfonates.

The slurry of the filter cake and the aqueous solution containing the wetting agent is stirred for a short period of time, filtered and the filter cake washed with several additional volumes of fresh water. In this way, the mother liquor is completely washed off the crystallized p-dichlorobenzene and no substantial quantity is lost in the process.

The following examples illustrate preferred methods of carrying out the present invention.

*Example 1.*—Redistilled still bottoms from the chlorination of benzene, containing predominantly para-dichlorobenzene, also ortho and meta dichlorobenzenes and higher chlorinated benzenes, were chilled to 25° C., and filtered. The filter cake was slurried with about two parts by weight of water containing 5% of Drew's M-401 Base Emulsifier, again filtered and washed with water until the filtrate was essentially clear. There was obtained a yield of 37.9%, based on the bottoms of dichlorobenzene which had a setting point of 53.0° C. The mother liquor from the first crystallization was then cooled to −19° C., and an additional crop of crystals was obtained and treated in exactly the same way. In this manner, a second batch of dichlorobenzene was obtained having a setting point of 52.9 C. and consisting of 16.9% by weight of the original material. The filtrates from the emulsifier washes and each first plain water wash were saved and the balance of the water was discarded. The filtrates were heated to about 90° C. and salt was added to make a 5% NaCl solution. Immediate precipitation of an oil layer took place. The oil layer was separated from the aqueous layer and subjected to vacuum distillation at a pressure of 20 mm. until the still temperature reached 220° C. The mother liquor was taken overhead in the still, and the still residue consisted of the emulsifying agent which was suitable for reuse in the process.

*Example 2.*—The organic mother liquor from the first crystallization mentioned above was chilled to −22° C., precipitated crystals were filtered and without washing joined with about 1.5 parts of a fresh dichlorobenzene batch, which was then again chilled to +25° C. and filtered. The filter cake was washed with emulsifier solution and water, as described in Example 1, the organic mother liquor was again chilled to −22° C., filtered, filter cake again joined with about 1.5 parts of a fresh dichlorobenzene batch and the operation repeated. The product had a settling point of 53.0° C.

In carrying out the present invention, the temperatures of crystallization may be varied from about +25° C. to −23.4° C. The operation may be conducted in a single step by the employment of a solvent, but preferably is conducted in the two stages, to give a readily workable mixture.

I claim:

1. A process for the isolation of p-dichlorobenzene from a reaction mixture containing the three isomers of dichlorobenzene and more highly chlorinated benzene, comprising chilling the reaction mixture to a temperature of below about 25° C. to precipitate p-dichlorobenzene, filtering the mixture to obtain a filter cake containing p-dichlorobenzene in crystalline form wet with mother liquor, slurrying said filter cake with an aqueous solution containing a wetting agent, and refiltering said slurry.

2. The process of claim 1 wherein the emulsifying agent is a mixture of polyglycol esters of fatty acids and petroleum sulfonate.

3. The process for the isolation of p-dichlorobenzene from a reaction mixture containing the three isomers of dichlorobenzene and more highly chlorinated benzene, comprising chilling the reaction mixture to about 25° C. to precipitate p-dichlorobenzene therefrom, filtering the mixture to produce a first filter cake containing p-dichlorobenzene wet with mother liquor, and a first filtrate, slurrying said first filter cake with an aqueous solution containing a wetting agent and refiltering said slurry, chilling the first filtrate to a temperature of about −20° C. to produce a second filter cake and slurrying said second filter cake with an aqueous solution containing a wetting agent and refiltering said slurry.

4. A process for the treatment of polychlorinated bottoms comprising chilling the bottoms to about 25° C. to precipitate p-dichlorobenzene, filtering the mixture to produce a filter cake and a filtrate, chilling said filtrate to 22° C. to produce a second crop of crystals and filtering said mixture to produce a second filter cake and a filtrate, adding to said second filtrate about 1.5 parts of polychlorinated bottoms and adjusting the temperature to about 25° C. to precipitate para-dichlorobenzene and filtering said mixture to produce a filter cake wet with adherent mother liquor, slurrying said filter cake with an aqueous solution containing a wetting agent and filtering said slurry.

5. A process for the isolation of p-dichlorobenzene from redistilled polychlorinated bottoms comprising chilling the reaction mixture to a temperature of below about 25° C. to precipitate p-dichlorobenzene, filtering the mixture to obtain a filter cake containing p-dichlorobenzene in crystalline form wet with mother liquor, slurrying said filter cake with an aqueous solution containing a wetting agent, and refiltering said slurry.

References Cited in the file of this patent

UNITED STATES PATENTS

| | | |
|---|---|---|
| 1,923,419 | Britton | Aug. 22, 1933 |
| 2,514,191 | Rowland et al. | July 4, 1950 |